United States Patent
Frey et al.

(10) Patent No.: US 10,293,783 B2
(45) Date of Patent: May 21, 2019

(54) DRIVER DETECTION STEERING WHEEL

(71) Applicant: Ford Global Technologies, LLC, Dearborn, MI (US)

(72) Inventors: Michael Frey, Northville, MI (US); Michael Peter Mongeau, Royal Oak, MI (US); Bryce Crane, Plymouth, MI (US); Kyle Ness, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 15/158,863

(22) Filed: May 19, 2016

(65) Prior Publication Data
US 2017/0334392 A1 Nov. 23, 2017

(51) Int. Cl.
| | |
|---|---|
| *B60N 2/00* | (2006.01) |
| *G07C 5/02* | (2006.01) |
| *B60R 25/00* | (2013.01) |
| *G01D 5/241* | (2006.01) |
| *B60K 35/00* | (2006.01) |
| *B60K 37/06* | (2006.01) |

(52) U.S. Cl.
CPC ............ *B60R 25/00* (2013.01); *B60K 35/00* (2013.01); *B60K 37/06* (2013.01); *B60N 2/002* (2013.01); *G01D 5/2417* (2013.01); *B60K 2350/1036* (2013.01); *B60K 2350/928* (2013.01); *G07C 5/02* (2013.01)

(58) Field of Classification Search
CPC ...... B60R 25/00; B60N 2/002; G01D 5/2417; G07C 5/02
See application file for complete search history.

(56) References Cited

U.S. PATENT DOCUMENTS

| | | |
|---|---|---|
| 6,817,130 B2 | 11/2004 | Ivanov |
| 7,109,862 B2 | 9/2006 | Braeuchle et al. |
| 8,095,270 B2 | 1/2012 | Bossler et al. |
| | (Continued) | |

FOREIGN PATENT DOCUMENTS

| | | |
|---|---|---|
| FR | 3023519 A1 | 1/1916 |
| JP | 2014061761 A | 4/2014 |
| NL | 1039095 C | 4/2013 |

OTHER PUBLICATIONS

Search Report dated Oct. 5, 2017 for GB Patent Application No. 1707447.7 (6 pages).

(Continued)

*Primary Examiner* — Behrang Badii
*Assistant Examiner* — Daniel L Greene
(74) *Attorney, Agent, or Firm* — Frank Lollo; James P. Muraff; Neal, Gerber & Eisenberg LLP

(57) ABSTRACT

Example systems and methods for a driver detection steering wheel are disclosed. An example disclosed vehicle includes a steering wheel, a driver, a detector, and an enabling module. The example steering wheel includes a plurality of capacitive sensors. The example driver is to change voltage levels on the plurality of capacitive sensors. The example detector is to measure time delays corresponding to the plurality of capacitive sensors, and determine a number of hands on the steering wheel based on the time delays. The example enabling module is to, in response to the detector detecting two hands on the steering wheel, grant access to an infotainment system.

18 Claims, 8 Drawing Sheets

(56) References Cited

U.S. PATENT DOCUMENTS

| | | |
|---|---|---|
| 8,451,109 B1 | 5/2013 | Daniel et al. |
| 8,564,424 B2 | 10/2013 | Evarts et al. |
| 8,841,929 B2 | 9/2014 | Bennett et al. |
| 8,983,732 B2 | 3/2015 | Lisseman et al. |
| 9,007,190 B2 | 4/2015 | Bosch et al. |
| 9,024,741 B2 | 5/2015 | Bennett |
| 9,248,851 B2 | 2/2016 | Van'tZelfde et al. |
| 2003/0189493 A1 | 10/2003 | Klausner et al. |
| 2003/0220725 A1 | 11/2003 | Harter, Jr. et al. |
| 2005/0234622 A1* | 10/2005 | Pillar ............... A62C 27/00 701/41 |
| 2005/0273218 A1* | 12/2005 | Breed ............... B60C 11/24 701/2 |
| 2010/0253918 A1* | 10/2010 | Seder ............... G01S 13/723 353/13 |
| 2013/0124038 A1 | 5/2013 | Naboulsi |
| 2014/0163774 A1* | 6/2014 | Demeniuk ............... G08C 17/02 701/2 |
| 2014/0164559 A1* | 6/2014 | Demeniuk ............... H04B 1/082 709/217 |
| 2014/0172186 A1 | 6/2014 | Mashkevich et al. |
| 2014/0224040 A1 | 8/2014 | Van Tzelfde et al. |
| 2015/0141043 A1* | 5/2015 | Abramson ............... G01C 21/34 455/456.1 |
| 2015/0330931 A1 | 11/2015 | Fujikawa et al. |

OTHER PUBLICATIONS

Park, Jaehee. "Plastic optical fiber sensor for measuring driver-gripping force." Optical Engineering 50, No. 2 (2011): 020501-020501.

Coxworth, Ben. "Smart steering wheel detects driver drowsiness." http://www.gizmag.com/smart-steering-wheel-driver-drowsiness/38405/ (Jul. 10, 2015), accessed Jun. 26, 2016.

"Ford Launches New Technology to Help Sleepy Drivers," Sleep Diagnosis and Therapy, accessed Jun. 27, 2016, http://www.sleepdt.com/ford-launches-new-technology-to-help-sleepy-drivers/.

* cited by examiner

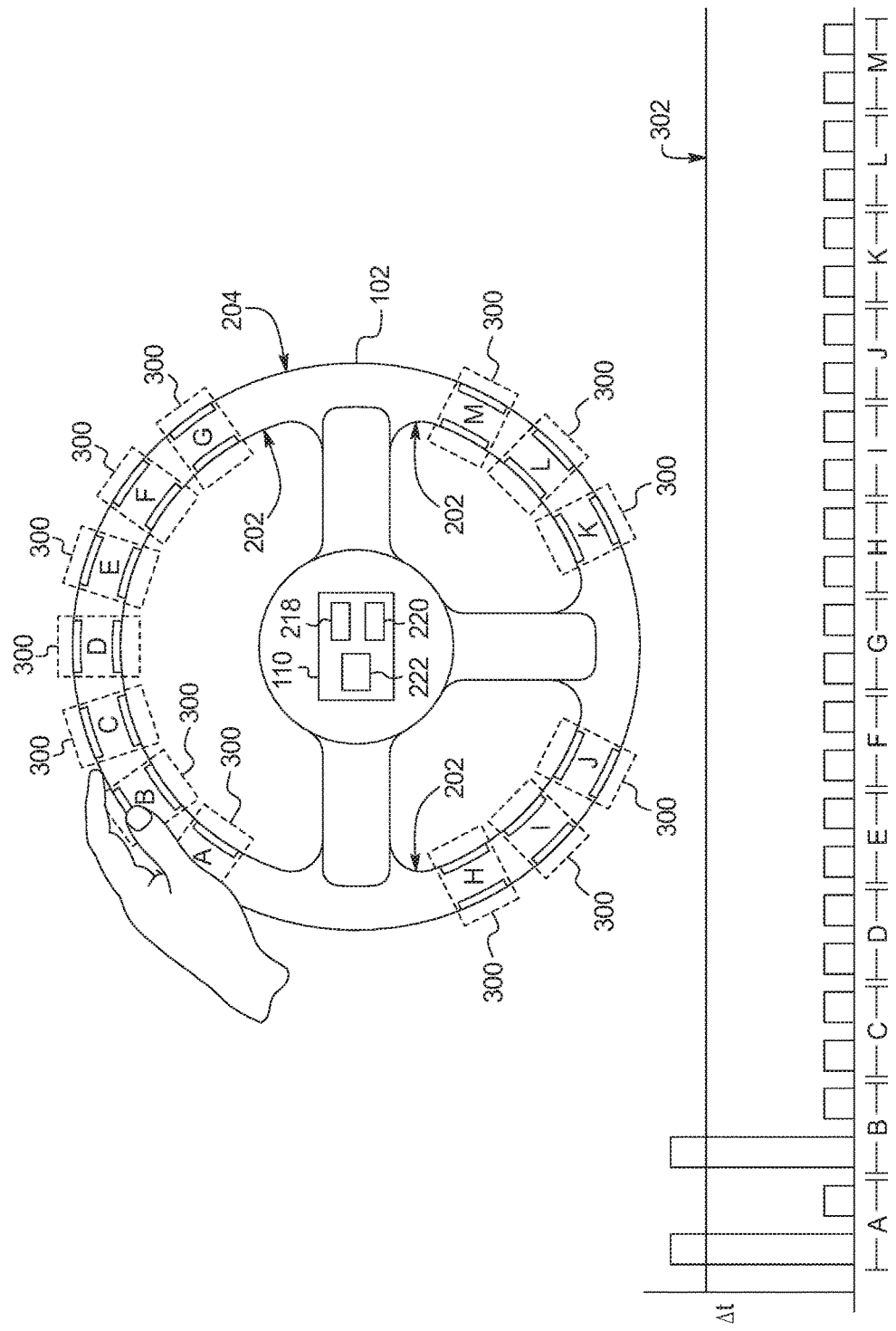

DRIVER DETECTION STEERING WHEEL

TECHNICAL FIELD

The present disclosure generally relates to controlling access to infotainment features of a vehicle and, more specifically, a driver detection steering wheel.

BACKGROUND

Increasingly, more features are being added to infotainment systems of vehicles. These features can distract drivers. In response, these features are often locked when the vehicle is in motion. However, a passenger may be able to use the infotainment features without causing a driver to be distracted. Locking a passenger out of the infotainment features can cause frustration and confusion.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments for a driver detection steering wheel are disclosed. An example disclosed vehicle includes a steering wheel, a driver, a detector, and an enabling module. The example steering wheel includes a plurality of capacitive sensors. The example driver is to change voltage levels on the plurality of capacitive sensors. The example detector is to measure time delays corresponding to the plurality of capacitive sensors, and determine a number of hands on the steering wheel based on the time delays. The example enabling module is to, in response to the detector detecting two hands on the steering wheel, grant access to an infotainment system.

An example system includes a steering wheel with a plurality of capacitive sensors. The example system also includes a driver to change voltage levels on the plurality of capacitive sensors. The example system includes a controller. Additionally, the example system includes memory storing instructions that, when executed, cause the controller to measure time delays corresponding to the plurality of capacitive sensors, determine a number of hands on the steering wheel based on the time delays, and, in response to the detector detecting two hands on the steering wheel, grant access to an infotainment system.

An example method includes changing voltage levels on a plurality of capacitive sensors embedded in a steering wheel. The example method also includes measuring time delays corresponding to the plurality of capacitive sensors. Additionally, the method includes determining a number of hands on the steering wheel based on the time delays, and, in response to detecting two hands on the steering wheel, granting access to an infotainment system.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 3A, 3B, and 3C illustrate the driver detection steering wheel of FIG. 1 detecting signals alterable by hands of the driver touching the capacitive sensors.

DETAILED DESCRIPTION OF EXAMPLE EMBODIMENTS

Figure 1:
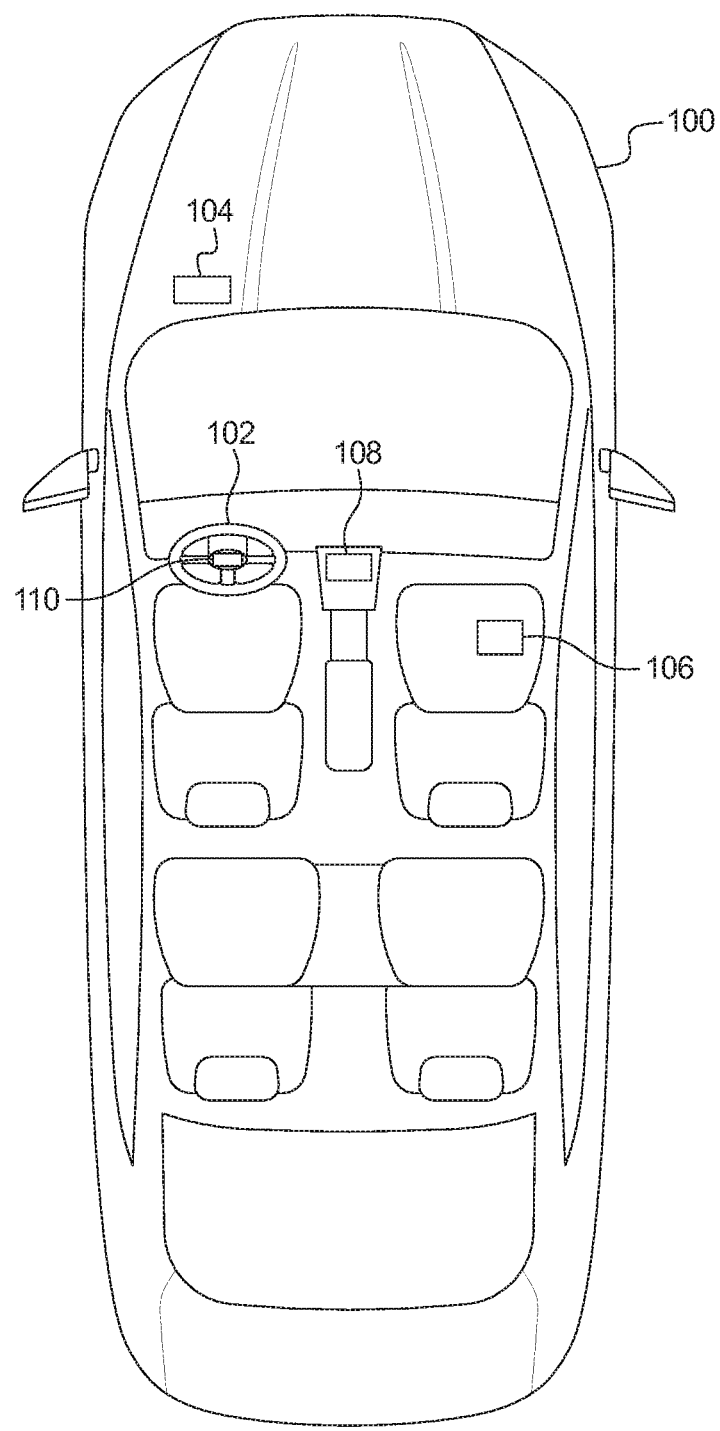
FIG. 1 illustrates a vehicle with a driver detection steering wheel in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many functions of an infotainment system, such as navigation input and Bluetooth® pairing, are disabled when a vehicle is moving faster than a set speed, such as five miles per hour (mph). Disabling these functions removes a temptation from a driver to use the functions and become distracted. However, passengers can become frustrated when they cannot use the disabled features, despite the fact that it is safe for them to do so. As disclosed herein, several capacitive sensor groups are embedded in a steering wheel to detect when both of the driver's hands are placed on the steering wheel. The capacitive sensor groups include at least two capacitive sensors positioned on the steering wheel so that one of the driver's hands interacts with all of the capacitive sensors in the group when the hand is gripping the steering wheel. In such a manner, the capacitive sensor groups distinguish between a hand gripping the steering wheel and some other body part (such as an elbow) touching the steering wheel. A steering control unit detects when two non-adjacent capacitive sensor groups detect a hand to determine when both of the driver's hands are engaged with the steering wheel. In some examples, a weight sensor on the front passenger seat confirms whether there is a passenger to use the infotainment system. As disclosed below, the capacitive sensors include a conductive plate and a resistive element. The hand of the driver causes an increased capacitance of the conductive plate. Additionally, a signal is driven onto the capacitive sensor. A time delay ($\Delta t$) between the signal being driven onto capacitive sensor and the signal being received by a sensor driver is measured and compared to a time delay threshold. The greater the capacitance of the conductive plate (e.g., caused by a hand proximate the conductive plate), the longer time delay ($\Delta t$). When the time delays ($\Delta t$) of the capacitive sensors of a capacitive sensor group satisfy the time delay threshold, the steering control unit determines that a hand is gripping the steering wheel.

FIG. 1 illustrates a vehicle 100 with a driver detection steering wheel 102 in accordance with the teachings of this disclosure. The vehicle 100 may be a standard gasoline powered vehicle, a hybrid vehicle, an electric vehicle, a fuel cell vehicle, or any other mobility implement type of vehicle. The vehicle 100 may be non-autonomous, semi-autonomous, or autonomous. The vehicle 100 includes parts related to mobility, such as a powertrain with an engine, a transmission, a suspension, a driveshaft, and/or wheels, etc. In the illustrated example, the vehicle 100 includes a vehicle speed sensor 104, a passenger sensor 106, an infotainment head unit 108, the driver detection steering wheel 102, and a steering control unit 110.

The vehicle speed sensor 104 measures the speed of the vehicle 100. The vehicle speed sensor 104 may include one or more wheel speed sensors and/or an axle speed sensor. The vehicle speed sensor 104 is used to determine when the vehicle 100 is in motion. The passenger sensor 106 detects whether a passenger is occupying the front passenger seat of the vehicle 100. In some examples, the passenger sensor 106 is a weight sensor coupled to the front passenger seat of the vehicle 100. Alternatively, in some examples, the passenger sensor 106 may be any sensor suitable to detect the passenger, such as an infrared sensor or a camera, etc.

The infotainment head unit 108 provides an interface between the vehicle 100 and a user (e.g., a driver, a passenger, etc.). The infotainment head unit 108 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. The infotainment head unit 108 provides an interface to interact with aspects of the infotainment system, such as navigation, entertainment system control, Bluetooth pairing, heating, ventilating, and air conditioning (HVAC) control, applications, and/or telephony control, etc. Based on instructions from the steering control unit 110, the infotainment head unit 108 disables (e.g., restricts) access to certain functions. For example, the infotainment head unit 108 may execute and display a navigation application, but may disable input to the navigation application while the vehicle 100 is traveling over 5 mph. In some examples, the infotainment head unit 108 maintains a list of functions that may be used when the vehicle 100 is in motion. In such examples, when instructed, the infotainment head unit 108 disables functions and/or applications not on the list.

As discussed in more detail below in connection with FIGS. 2A, 2B and 3A, 3B, 3C, the driver detection steering wheel 102 detects the presence of the hand(s) of the driver on the steering wheel 102. The driver detection steering wheel 102 includes capacitive sensors embedded in the steering wheel 102. The capacitive sensors are organized into groups. The capacitive sensors are positioned so that capacitive sensors in a group detect the presence of a hand when the hand is gripping (e.g. the fingers are wrapped around) the driver detection steering wheel 102.

As discussed in more detail below in connection with FIGS. 2A, 2B and 3A, 3B, 3C, the steering control unit 110 instructs the infotainment head unit 108 to enable and disable certain functions of the infotainment system based on a number of capacitive sensor groups that detect a hand of the driver. The steering control unit 110 is communicatively coupled to the vehicle speed sensor 104. The steering control unit 110 compares the speed of the vehicle 100 to a speed threshold. In some examples, the speed threshold is five mph. When the speed of the vehicle 100 satisfies (e.g., is greater than or equal to, etc.) the speed threshold, the steering control unit 110 instructs the infotainment head unit 108 to disable certain functions. While the speed threshold is satisfied, the steering control unit 110 instructs the infotainment head unit 108 to re-enable the disabled functions when the steering control unit 110 detects two hands on the steering wheel 102. In some examples, the steering control unit 110 is communicatively coupled to the passenger sensor 106. In such examples, the steering control unit 110 instructs the infotainment head unit 108 to re-enable the disabled functions when (a) the steering control unit 110 detects two hands on the steering wheel 102, and (b) the passenger sensor 106 detects a passenger in the front passenger seat.

Figure 2A:
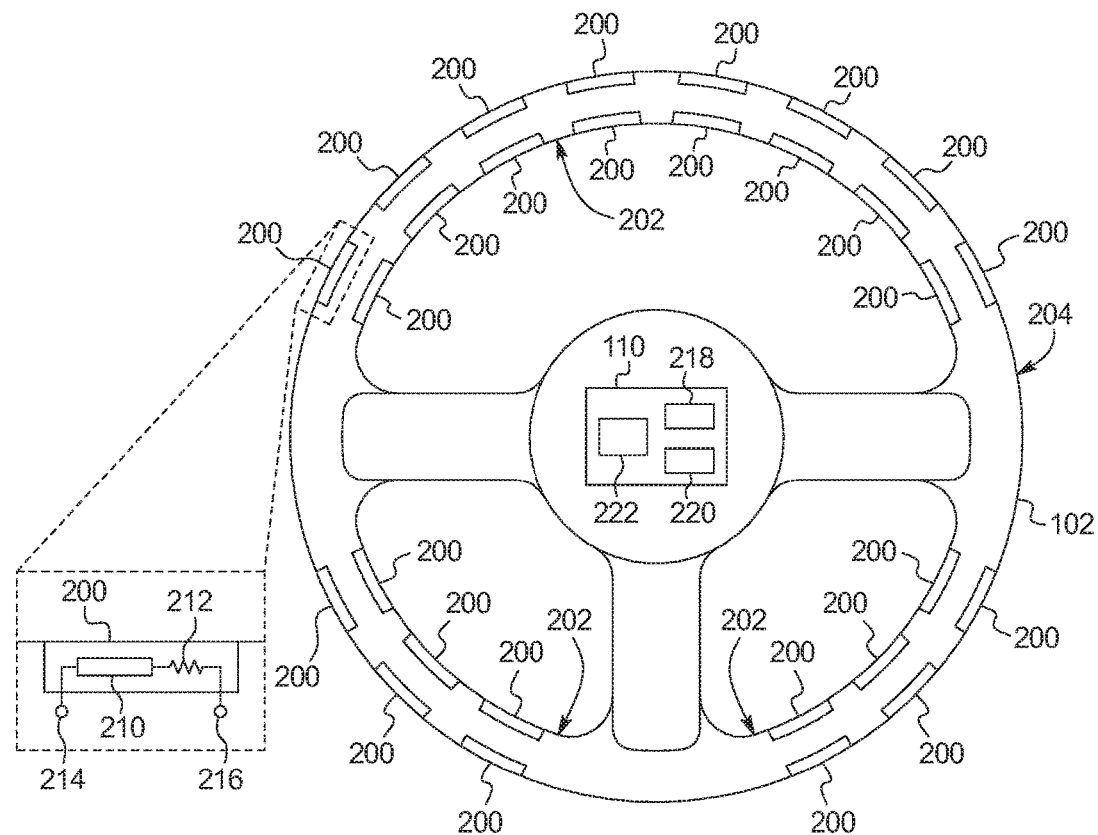
FIGS. 2A and 2B illustrate the driver detection steering wheel of FIG. 1 with capacitive sensors.
Figure 2B:
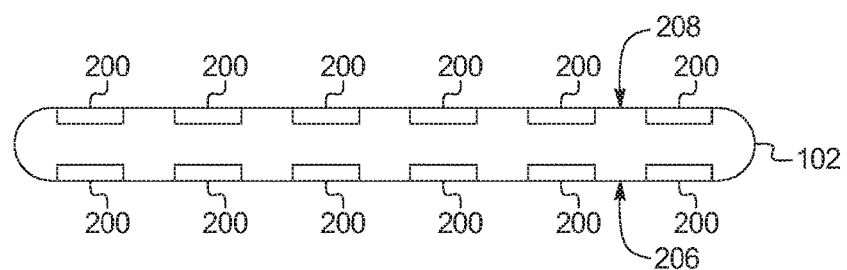

FIGS. 2A and 2B illustrate the driver detection steering wheel 102 of FIG. 1 with capacitive sensors 200. In the illustrated example of FIG. 2A, the capacitive sensors 200 are embedded in an inner perimeter 202 of the steering wheel 102 and an outer perimeter 204 of the steering wheel 102. In the illustrated example of FIG. 2B, the capacitive sensors 200 are embedded in a front portion 206 (e.g., facing the driver) of the steering wheel 102 and a back portion 208 (e.g., on the opposite side as the driver) of the steering wheel 102. In some examples, the capacitive sensors 200 are flush with the steering wheel 102. Additionally, in some examples, the capacitive sensors 200 are covered in a non-conductive material (e.g., fabric) such as nylon, rubber, or PVC, etc. Alternatively, in some examples, the capacitive sensors 200 are arranged around the cross-sectional circumference of the steering wheel 102 based on an angle between the capacitive sensors 200 long the same cross-sectional circumference of the steering wheel 102. For example, in FIGS. 2A and 2B, the capacitive sensors 200 long the same cross-sectional circumference of the steering wheel 102 are 180 degrees apart. In some examples, the angle may be between 60 degrees to 180 degrees.

The capacitive sensors 200 include a capacitive plate 210, resistive element 212, a signal terminal 214, and a measurement terminal 216. The capacitance of the capacitive plate 210 increases when a part of the hand of the driver is proximate the capacitive sensors 200. A variable voltage source (e.g., an output pin of a processor 404 of FIG. 4, etc.) is electrically coupled to the signal terminal 214. The measurement terminal 216 is electrically coupled to a voltage measurement device (e.g., an input pin of the processor 404 of FIG. 4, etc.). A time delay ($\Delta t$) is measured between (i) when a voltage changes (e.g., from a low voltage to a high voltage or from a high voltage to a low voltage) on the signal terminal 214 and (ii) when the voltage changes on the corresponding measurement terminal 216. As the capacitance of the capacitive plate 210 increases, the time delay ($\Delta t$) increases.

In the illustrated example of FIG. 2A, the steering control unit 110 includes a driver module 218, a hand detection module 220 (sometime referred to as "a detector"), and an enabling module 222. The driver module 218 is electrically coupled to the signal terminals 214 of the capacitive sensors 200. The driver module 218, from time-to-time, changes the voltage on the signal terminals 214 from a low voltage (e.g., 0 volts, 0.5 volts, etc.) to a high voltage (e.g., 3.3 volts, 5 volts, etc.). In some examples, the driver module 218 incorporates analog components (e.g., transistors, resistors, capacitors, diodes, operational amplifiers, etc.) and/or digital components (e.g., encoders, decoders, etc.) that isolate the output pins of the processor and/or supply current to drive the capacitive sensors 200, etc.

The hand detection module 220 is electrically coupled to the measurement terminals 216 of the capacitive sensors. When the driver module 218 changes the voltage on one of the signal terminals 214, the hand detection module 220 measures the time delay (Δt) from when the driver module 218 changes the voltage on one of the signal terminals 214 to when the voltage changes on the corresponding one of the measurement terminals 216. The hand detection module 220 compares the time delay (Δt) to a delay threshold. If the time delay (Δt) satisfies (e.g., is greater than, etc.) the delay threshold, the hand detection module 220 indicates that a portion of the drivers hand is proximate the corresponding capacitive sensor 200. In some examples, from time to time (e.g., upon an ignition switch being turned to start, etc.), the hand detection module 220 calibrates the delay threshold to account for environmental and/or driver differences. In some examples, the hand detection module 220 incorporates analog components (e.g., transistors, resistors, capacitors, diodes, operational amplifiers, etc.) and/or digital components (e.g., encoders, decoders, etc.) that isolate the input pins of the processor and/or reduce the number of input pins used, etc.

The enabling module 222 instructs the infotainment head unit 108 to disable or enable functionality of the infotainment head unit 108. The enabling module is communicatively coupled to the vehicle speed sensor 104. When the speed of the vehicle 100 satisfies (e.g., is greater than or equal to, etc.) the speed threshold, the enabling module 222 instructs the infotainment head unit 108 to disable at least some of its functions. When the enabling module 222 detects two hands of the driver on the steering wheel 102, the enabling module 222 instructs the infotainment head unit 108 to re-enable its disabled functions. In some examples, the enabling module 222 is communicatively coupled to the passenger sensor 106. In such examples, the enabling module 222 instructs the infotainment head unit 108 to re-enable its disabled functions when (a) the enabling module 222 detects two hands on the steering wheel, and (b) the passenger sensor 106 detects a passenger.

Figure 3A:
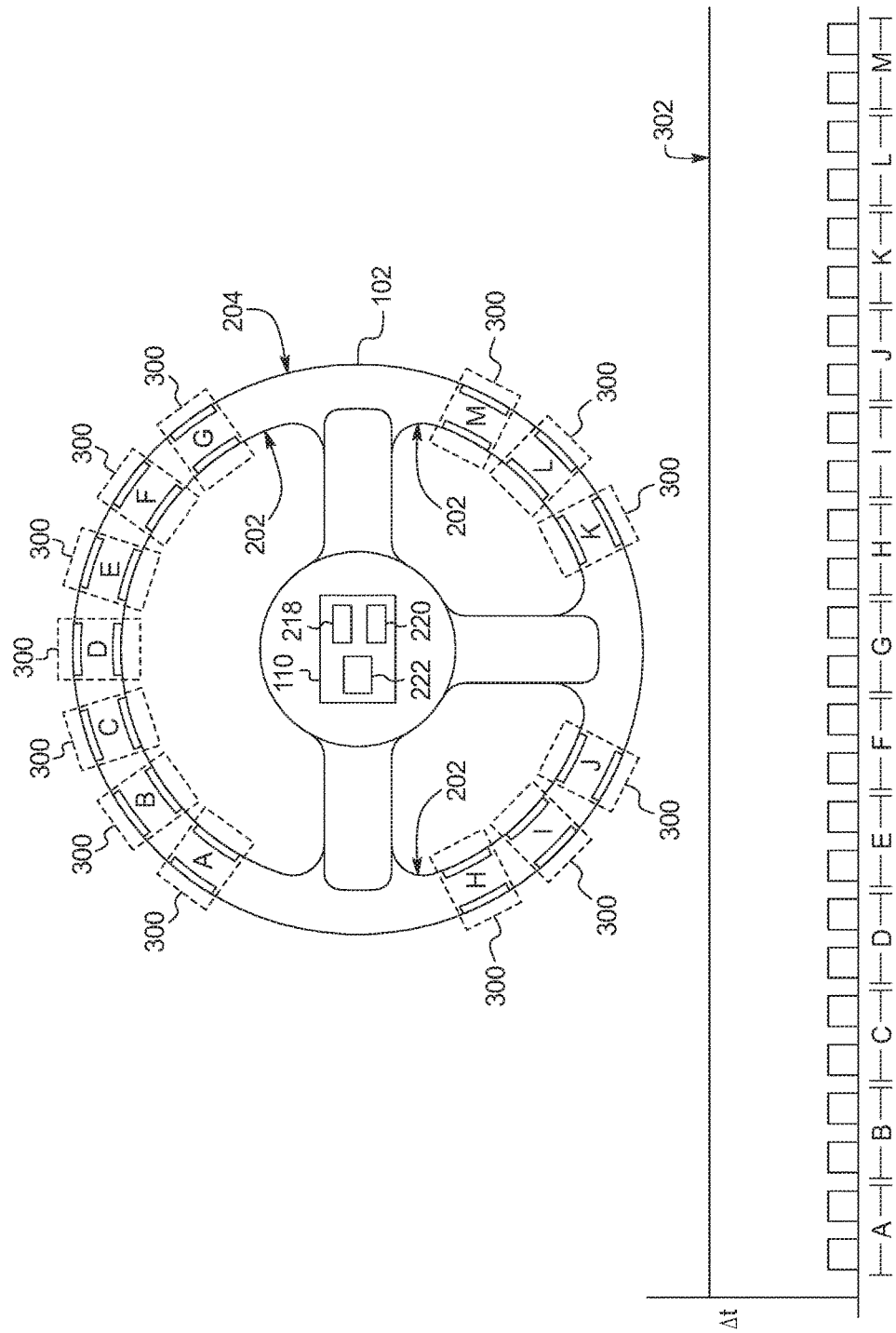
Figure 3B:
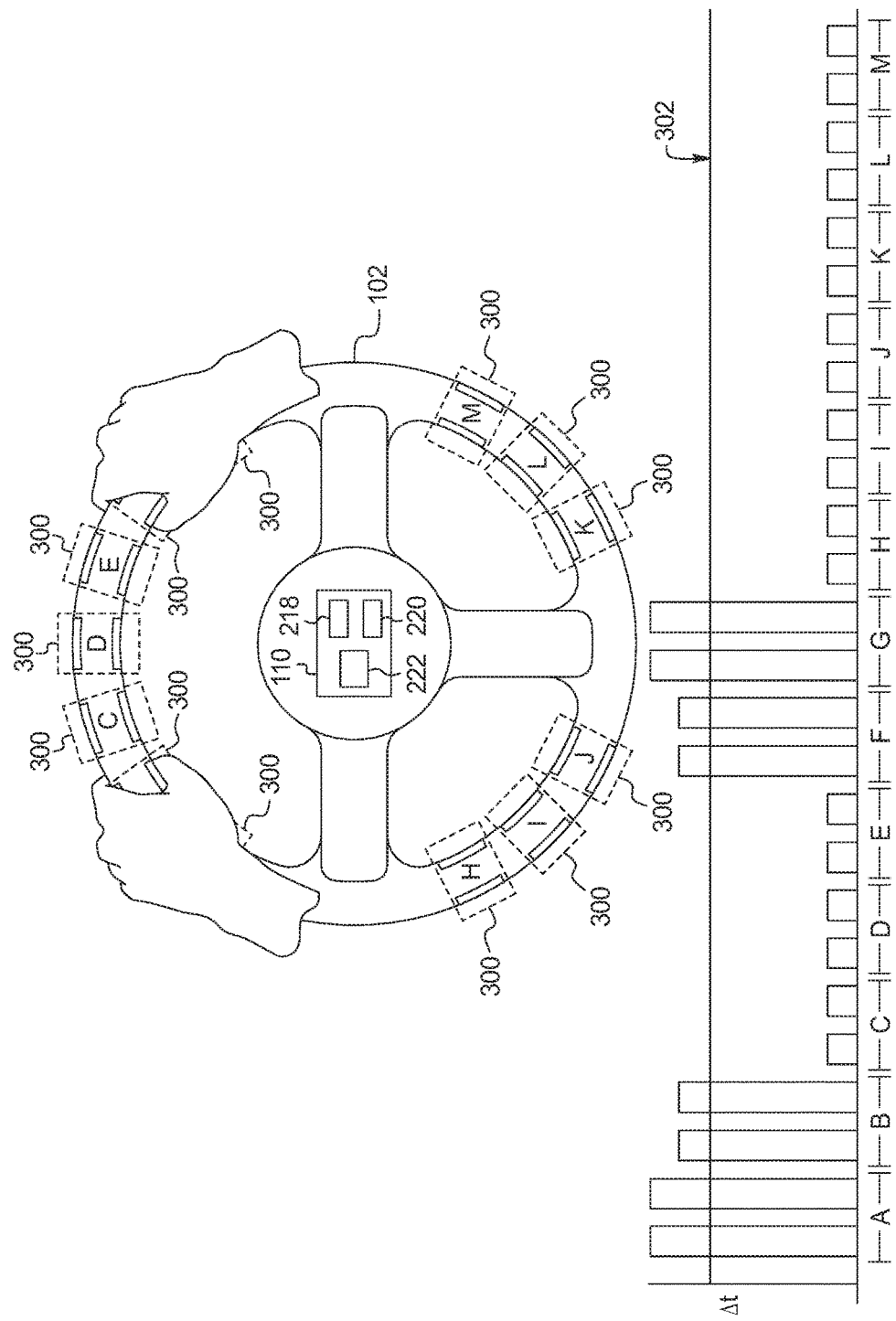

To detect hands on the steering wheel 102, the enabling module 222 is communicatively coupled to the hand detection module 220. As illustrated in FIGS. 3A, 3B, and 3C, the enabling module 222 organizes the capacitive sensors 200 into capacitive sensor groups 300. The capacitive sensors 200 in a capacitive sensor group 300 are positioned in the same cross-sectional circumference of the steering wheel 102. For example, a first capacitive sensor 200 in one of the capacitive sensor groups 300 may be on the outer perimeter 204 and a second capacitive sensor 200 in the capacitive sensor groups 300 may be on the inner perimeter of the steering wheel 102 on the same cross-sectional circumference. The capacitive sensors 200 are associated with the capacitive sensor groups 300 so that when the hand are gripped around the cross-sectional circumference of the steering wheel 102, the palm and fingers of the hand will be proximate the capacitive sensors 200 in the corresponding capacitive sensor group 300. The enabling module 222 determines that a hand is positioned on the steering wheel 102 when the time delays (Δt) of the capacitive sensors 200 in one of the capacitive sensor groups 300 satisfy the delay threshold 302.

The enabling module 222 determines that two hands are positioned on the steering wheel 102 when the time delays (Δt) of the capacitive sensors 200 in multiple ones of the capacitive sensor groups 300 satisfy the delay threshold 302. In some examples, the enabling module 222 determines that two hands are positioned on the steering wheel 102 when either (a) the multiple ones of the capacitive sensor groups 300 are non-contiguous, or (b) a threshold number (e.g., three, four, etc.) of capacitive sensor groups 300 detect the hand(s) of the driver (e.g., the hands are close on the steering wheel 102). For example, the enabling module 222 may determine that two hands are positioned on the steering wheel 102 if capacitive sensor group A and capacitive sensor group E detect a hand (e.g. likely different hands), but not if capacitive sensor group C and capacitive sensor group D detect a hand (e.g., likely the same hand). In the illustrated example of FIG. 3A, no hands are on the steering wheel 102. In that example, the capacitive sensors 200 in none of the capacitive sensor groups 300 satisfy the delay threshold 302. In the illustrated example of FIG. 3B, the enabling module 222 determines that two hands are positioned on the steering wheel 102 because (a) the capacitive sensors 200 of the capacitive sensor groups A, B, F, and G satisfy the delay threshold 302, and (b) capacitive sensor groups B and F are not adjacent to each other. In the illustrated example of FIG. 3C, the enabling module 222 determines that no hands are positioned on the steering wheel 102 because only some of the capacitive sensors 200 of the capacitive sensor groups A and B (e.g., the capacitive sensors 200 on the top of the steering wheel 102) satisfy the delay threshold 302.

Figure 4:
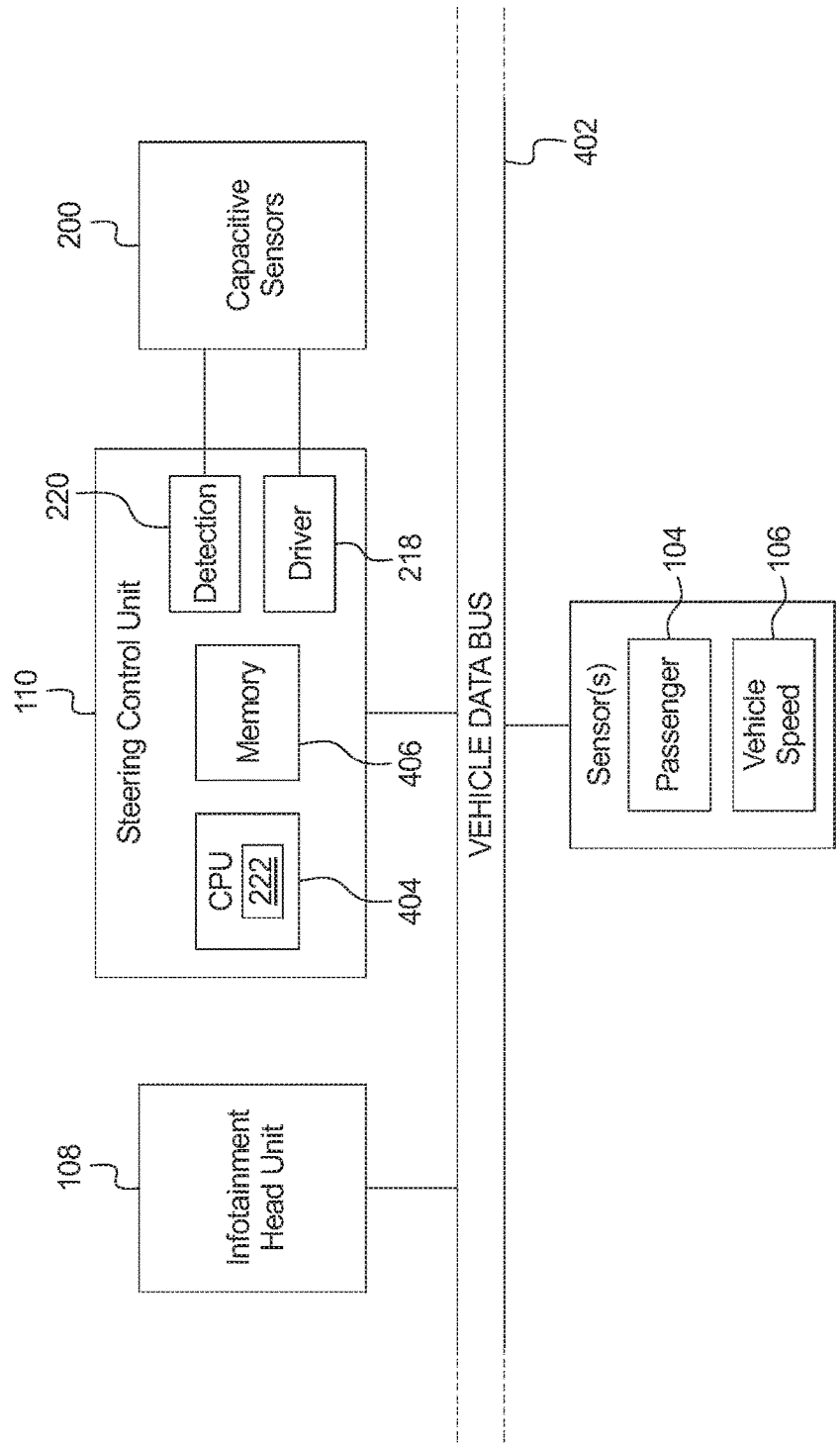
FIG. 4 a block diagram of electronic components of the vehicle of FIG. 1.

FIG. 4 a block diagram of electronic components 400 of the vehicle 100 of FIG. 1. In the illustrated example, the electronic components 400 include a vehicle data bus 402, the infotainment head unit 108, the steering control unit 110, the capacitive sensors 200, the vehicle speed sensor 104, and the passenger sensor 106. The vehicle data bus 402 communicatively couples the sensors 104 and 106, the infotainment head unit 108, the steering control unit 110, and other devices connected to the vehicle data bus 402. In some examples, the vehicle data bus 402 is implemented in accordance with the controller area network (CAN) bus protocol as defined by International Standards Organization (ISO) 11898-1. Alternatively, in some examples, the vehicle data bus 402 may be a Media Oriented Systems Transport (MOST) bus, or a CAN flexible data (CAN-FD) bus (ISO 11898-7).

The steering control unit 110 includes a processor or controller 404, and memory 406. Additionally, the steering control unit 110 includes the driver module 218 and the hand detection module 220. In some examples, the processor or controller 404 is structured to include the enabling module 222. Alternatively, in some examples, the enabling module 222 is a separate the processor or controller. The processor or controller 404 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 406 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and or high-capacity storage devices (e.g., a hard drive, a solid state drive, etc.). In some examples, the memory 406 includes multiple kinds of memory, particularly volatile memory and non-volatile memory.

The memory 406 is/are computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 406, the computer readable medium, and/or within the processor 404 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 5:
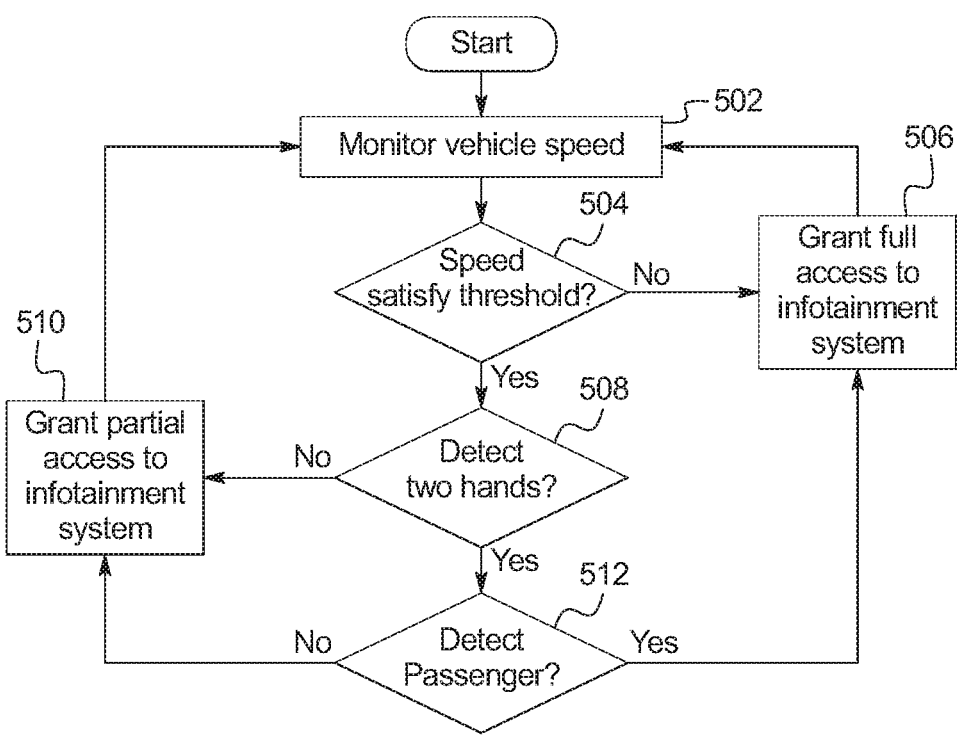
FIG. 5 is a flowchart of an example method to manage functionality of the infotainment system.

FIG. 5 is a flowchart of an example method to manage functionality of the infotainment head unit 108. The example method of FIG. 5 is executed when, for example, the ignition switch of the vehicle 100 is switched to start. Initially, at block 502, the enabling module 222, via the vehicle speed sensor 104, monitors the speed of the vehicle 100. At block 504, the enabling module 222 compares the speed of the vehicle 100 to a speed threshold. In some examples, the speed threshold is five mph. If the speed of the vehicle 100 does not satisfy (e.g., is less than) the speed threshold, the method continues to block 506. Otherwise, if the speed of the vehicle 100 satisfies (e.g., is greater than or equal to) the speed threshold, the method continues to block 508. At block 506, the enabling module 222 instructs the infotainment head unit 108 to grant full access to the functions of the infotainment system.

At block 508, the enabling module 222 determines whether two hands are detected on the steering wheel 102. An example method to detect whether two hands are on the steering wheel 102 is disclosed in connection with FIG. 6 below. If two hands are not detected on the steering wheel 102, the method continues to block 510. Otherwise, if two hands are detected on the steering wheel 102, the method continues to block 512. At block 510, the enabling module 222 instructs the infotainment head unit 108 to grant partial access to the infotainment system. For example, the infotainment head unit 108 may disable input to applications executing in the infotainment system. At block 512, the enabling module 222, via the passenger sensor 106, determines whether a passenger is in the front passenger seat of the vehicle 100. If there is a passenger is in the front passenger seat of the vehicle 100, the method continues to block 506, at which the enabling module 222 instructs the infotainment head unit 108 to grant full access to the functions of the infotainment system. Otherwise, if there is not a passenger is in the front passenger seat of the vehicle 100, the method continues to block 510, at which the enabling module 222 instructs the infotainment head unit 108 to grant partial access to the infotainment system.

Figure 6:
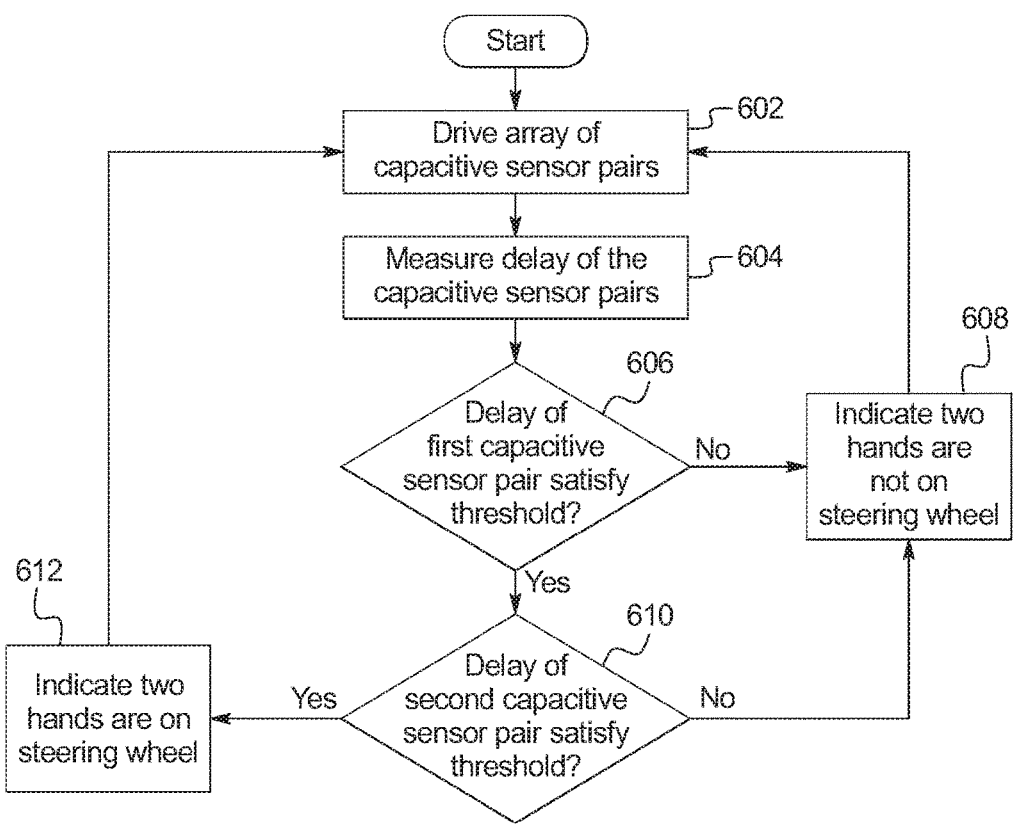
FIG. 6 is a flowchart of an example method to detect hands on the driver detection steering wheel of FIG. 1.

FIG. 6 is a flowchart of an example method to detect hands on the driver detection steering wheel 102 of FIG. 1. Initially, at block 602, the driver module 218 drives (e.g., changes voltage levels) the capacitive sensors 200. At block 604, the hand detection module 220 measures the time delay ($\Delta t$) for the capacitive sensors 200. At block 606, the hand detection module 220 determines if the time delay ($\Delta t$) of ones of the capacitive sensors 200 associated with a first capacitive sensor group 300 satisfy the delay threshold. If the ones of the capacitive sensors 200 associated with a first capacitive sensor group 300 do not satisfy the delay threshold, the method continues to block 608. Otherwise, the ones of the capacitive sensors 200 associated with a first capacitive sensor group 300 do satisfy the delay threshold, the method continues to block 610. At block 608, the hand detection module 220 indicates that two hands are not on the steering wheel 102.

At block 610, the hand detection module 220 determines if the time delay ($\Delta t$) of ones of the capacitive sensors 200 associated with a second capacitive sensor group 300 satisfy the delay threshold. In some examples, the hand detection module 220 does not consider capacitive sensor groups 300 that are adjacent to the first capacitive sensor group 300 detected at block 606. If the ones of the capacitive sensors 200 associated with the second capacitive sensor group 300 do not satisfy the delay threshold, the method continues to block 608, at which, the hand detection module 220 indicates that two hands are not on the steering wheel 102. Otherwise, the ones of the capacitive sensors 200 associated with a first capacitive sensor group 300 do satisfy the delay threshold, the method continues to block 612. At block 612, the hand detection module 220 indicates that two hands are on the steering wheel 102.

The flowcharts of FIGS. 5 and 6 are methods that may be implemented by machine readable instructions that comprise one or more programs that, when executed by a processor (such as the processor 404 of FIG. 4), cause the vehicle 100 to implement the driver module 218, the hand detection module 220, and/or the enabling module 222 of FIGS. 2A, 2B, 3A, 3B, and 4. Further, although the example program(s) is/are described with reference to the flowcharts illustrated in FIGS. 5 and 6, many other methods of implementing the example driver module 218, the example hand detection module 220, and/or the example enabling module 222 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a steering wheel comprising:
      a body;
      a wheel;
      pillars connecting the wheel to the body;

first sensors disposed on the wheel and facing away from the body; and
second sensors disposed on the wheel and facing the body, each of the first sensors and second sensors forming a group;
a vehicle speed sensor;
a passenger sensor; and
processors configured to:
measure a duration of having a number of hands on the steering wheel by using the first sensors and the second sensors; and
responsive to detecting, via the first sensors and the second sensors, two hands on the steering wheel for a predetermined period, responsive to detecting, via the vehicle speed sensor, that a speed of the vehicle is greater than a predetermined speed, and responsive to detecting, via the passenger sensor, a passenger, grant access to an infotainment system; and
responsive to less than all sensors in the group satisfying a delay threshold, limit access to an infotainment system.

2. The vehicle of claim 1, wherein the first sensors and the second sensors are capacitive sensors, and
wherein a first set of the capacitive sensors are embedded in a top perimeter of the steering wheel, and a second set of the capacitive sensors are embedded in a bottom perimeter of the steering wheel.

3. The vehicle of claim 1, wherein the first sensors and the second sensors are capacitive sensors, and
wherein a first set of the capacitive sensors are embedded in a front perimeter of the steering wheel, and a second set of the capacitive sensors are embedded in a rear perimeter of the steering wheel.

4. The vehicle of claim 1, wherein each of the first sensors and each of the second sensors are respectively disposed on opposing sides of the wheel.

5. The vehicle of claim 1, wherein the first sensors are evenly separated from each other, and wherein the second sensors are evenly separated from each other.

6. The vehicle of claim 1, wherein the first sensors and the second sensors are separated from each other.

7. The vehicle of claim 1, wherein the first sensors and the second sensors are capacitive sensors, and
wherein to determine a number of hands of the steering wheel, the processors compare time delays corresponding to the capacitive sensors to the delay threshold, wherein each of the time delays of each of the capacitive sensors is a time delay between a change from a first voltage level to a second greater voltage level.

8. The vehicle of claim 7, wherein processors are further configured to:
determine that a first hand is on the steering wheel in response to the time delays associated with a first pair of the of capacitive sensors satisfing the delay threshold; and
determine that a second hand is on the steering wheel in response to the time delays associated with a second pair of the capacitive sensors satisfing the delay threshold.

9. The vehicle of claim 8, wherein the first pair and the second pair are not adjacent on the steering wheel.

10. The vehicle of claim 1, wherein the first sensors and the second sensors are capacitive sensors, and wherein each of the capacitive sensors comprises:
a first terminal;
a second terminal;
a capacitive plate; and
a resistive element.

11. The vehicle of claim 10, wherein the first terminal, the capacitive plate, the resistive element, and the second terminal are sequentially connected in series.

12. The vehicle of claim 10, further comprising: a voltage measurement device; and a variable voltage source, wherein the first terminal is electrically connected to the variable voltage source, and wherein the second terminal is electrically connected to the voltage measurement device.

13. A system comprising:
a steering wheel comprising:
a body;
a wheel;
pillars connecting the wheel to the body
first capacitive sensors disposed on the wheel and facing away from the body; and
second capacitive sensors disposed on the wheel and facing the body, each of the first capacitive sensors and the second capacitive sensors forming a group;
a vehicle speed sensor;
a passenger sensor;
a controller; and
memory storing instructions that, when executed, cause the controller to:
detect a duration of having a number of hands on the steering wheel using the first capacitive sensors and the second capacitive sensors;
detect a speed of the vehicle using the vehicle speed sensor; and
detect a passenger using the passenger sensor; and
responsive to detecting two hands on the steering wheel for a predetermined period, responsive to detecting the speed of the vehicle being greater than a predetermined speed, and responsive to detecting the passenger, grant access to an infotainment system; and
responsive to less than all sensors in the group satisfying a delay threshold, limit access to an infotainment system.

14. The system of claim 13, wherein a first set of the first capacitive sensors and the second capacitive sensors are embedded in a top perimeter of the steering wheel, and a second set of the first capacitive sensors and the second capacitive sensors are embedded in a bottom perimeter of the steering wheel.

15. The system of claim 13, wherein to determine the number of hands of the steering wheel, the instructions stored in the memory, when executed, cause the controller to compare time delays corresponding to the first capacitive sensors and the second capacitive sensors to the delay threshold, wherein each of the time delays of each of the capacitive sensors is a time delay between a change from a first voltage level to a second greater voltage level.

16. The system of claim 15, wherein the instructions stored in the memory, when executed, cause the controller configured to:
determine, when a first hand is on the steering, if time delays associated with a first pair of the first capacitive sensors and the second capacitive sensors satisfy the delay threshold; and
determine, when a second hand is on the steering, if time delays associated with a second pair of first capacitive sensors and the second capacitive sensors satisfy the delay threshold.

17. The system of claim 16, wherein the first pair and the second pair are not adjacent on the steering wheel.

18. A vehicle comprising:
steering wheel comprising:

a body;
a wheel;
pillars connecting the wheel to the body;
first sensors disposed on the wheel and facing away from the body;
second sensors disposed on the wheel and facing the body, each of the first sensors and the second sensors forming a group; and
processors configured to, responsive to less than all sensors in the group satisfying a threshold, limit access to an infotainment system.

* * * * *